(12) United States Patent
Trenel et al.

(10) Patent No.: US 6,514,015 B1
(45) Date of Patent: Feb. 4, 2003

(54) ANTI-CONTAMINATION DEVICE FOR THE TRANSPORT OF RECIPIENTS AND AIR CONVEYOR EQUIPPED WITH SUCH A DEVICE

(75) Inventors: Joël Trenel, Marcq en Baroeul (FR); Carlos Rodrigues, Lille (FR); Jérôme Bariller, Lambersart (FR)

(73) Assignee: Netra Systems, Marcq en Baroeul (FR)

( * ) Notice: Subject to any disclaimer, the term of this patent is extended or adjusted under 35 U.S.C. 154(b) by 35 days.

(21) Appl. No.: 09/786,697

(22) PCT Filed: Jun. 30, 2000

(86) PCT No.: PCT/FR00/01875

§ 371 (c)(1),
(2), (4) Date: Mar. 8, 2001

(87) PCT Pub. No.: WO01/04029

PCT Pub. Date: Jan. 18, 2001

(30) Foreign Application Priority Data

Jul. 9, 1999 (FR) .............................................. 99 09119

(51) Int. Cl.[7] .............................................. B65G 53/16
(52) U.S. Cl. .............................. 406/86; 406/88; 406/83
(58) Field of Search ............................... 406/86, 88, 83

(56) References Cited

U.S. PATENT DOCUMENTS

| 5,028,174 A | * | 7/1991 | Karass | 406/86 |
| 5,246,314 A | | 9/1993 | Smith et al. | |
| 5,299,889 A | * | 4/1994 | Langenbeck | 406/191 |
| 5,484,237 A | * | 1/1996 | Langenbeck | 406/86 |
| 5,516,239 A | * | 5/1996 | Warren et al. | 406/88 |
| 5,842,818 A | * | 12/1998 | Simkowski | 406/182 |
| 5,984,591 A | * | 11/1999 | Hilbish et al. | 406/88 |
| 6,062,773 A | * | 5/2000 | Ouellette | 406/79 |
| 6,318,935 B1 | * | 11/2001 | Ouellette | 198/836.3 |
| 6,368,027 B1 | * | 4/2002 | Trenel et al. | 406/83 |

FOREIGN PATENT DOCUMENTS

| EP | 0 705 777 A | 4/1996 |
| WO | WO 99 14143 A | 3/1999 |

* cited by examiner

Primary Examiner—Christopher P. Ellis
Assistant Examiner—Richard Ridley
(74) Attorney, Agent, or Firm—Weingarten, Schurgin, Gagnebin & Lebovici LLP (57) ABSTRACT

The anti-contamination apparatus includes a transport enclosure (13) which has a input face (26) having an opening to admit the recipients and which contains: a guide rail capable of supporting the recipients by their protuberances; an inverted U-shaped longitudinal transport channel the legs of which surmount the guide rail. The apparatus further comprises a pneumatic device for blowing air in a direction (G) globally opposite to direction T of transport of the recipients, the device being capable of forming a frontal escape of air, from the inside towards the outside of the enclosure, via the admission opening of the input face (26).

19 Claims, 7 Drawing Sheets

ANTI-CONTAMINATION DEVICE FOR THE TRANSPORT OF RECIPIENTS AND AIR CONVEYOR EQUIPPED WITH SUCH A DEVICE

The present invention relates to the transport of recipients under the action of jets of air, the recipients being supported and guided, when they are set in movement, via a protuberance on their necks. It applies more especially to the transfer in line of light recipients, in particular made of plastic, or again, of parisons for subsequently forming plastic recipients by stretching and blow moulding. The present invention more precisely relates to a device and to an air conveyor for recipients that are designed so as to limit the phenomenon of contamination and, in particular, of particulate and/or microbial contamination (bacterial, fungic, spores, micro-algae, etc.), of these recipients, during their transport, through the device.

The Applicant has already sought, in document WO 99/14143, to minimise the extent of contamination of the recipients by proposing an air conveyor the transport enclosure of which is completely closed, with the exception of the input and output openings for the recipients and which, furthermore, comprises means for plural controlled, unidirectional releases to the outside of the transport enclosure. Thus, the recipients transported inside the enclosure are completely isolated from the ambient air in which the conveyor is placed, which makes it possible to limit the phenomena of contamination in contact with this ambient air. The unidirectional controlled-flow releases of air enable the flow of induced air to be prevented from entering the transport enclosure, unlike a transport enclosure provided with free release, or exhaust, orifices, or again, a transport enclosure comprising two longitudinal side walls not closed in the lower portion. The unidirectional controlled-flow air releases also make it possible to regulate the pressure inside the enclosure to a level that is sufficiently low not to impair the conveyability of the recipients.

The transport enclosure described in document WO 99/14143 is tight, with the sole exception of its two end faces, which are open to allow the recipients to enter and to exit.

In the attempt to minimise contamination, the aforementioned document simply provides for sealingly connecting the air conveyor upstream and downstream, i.e. in the area of its two open end faces, to the other items of equipment constituting the complete conveying line.

This solution, which is not further described in the aforementioned document, is only conceivable, if it is to be efficient, if the items of equipment to which said input and output openings are themselves isolated from all contamination. In practice, this proves not to be the case.

The object of the present invention is to remedy this drawback and thus to provide an anti-contamination device that prevents polluted air from being induced into any installation in which recipients are transported.

It is sought to attain this object, of course, for application in an air conveyor the transport enclosure of which is completely closed, with air release means, as disclosed in document WO 99/14143. However this is not an exclusive application as it is also sought to attain this object for a conveyor the transport enclosure of which is provided with free-release orifices, or again, which has longitudinal side walls on either side of the recipient transport path, even although the efficiency of such conveyors in terms of non-contamination would be reduced. It is also sought to attain this object in order to prevent contamination at the input to machines, or again, when recipients pass from a given room to a room classified as having a low contamination level.

This object is fully attained by means of the device according to the invention. This is a device in which recipients comprising a protuberance in the area of their necks are moved along a transport path and in a direction T, the device including a transport enclosure which has a input face having an opening to admit the recipients; this enclosure contains:

a guide rail capable of supporting the recipients by their protuberances;

a longitudinal transport channel surmounting the guide rail.

Characteristically, according to the invention, the device comprises pneumatic means for blowing air in a direction G globally opposite to direction T, said means being capable of forming a frontal escape of air, from the inside towards the outside of the enclosure, via the admission opening of the input face.

This frontal air escape from the inside towards the outside of the enclosure opposes the ingress of the polluted ambient air in which the device is placed, via its entry opening.

Preferably, the pneumatic means for blowing air, in direction G, comprise a chamber for supplying pressurised air, the wall or walls of which, turned towards the recipient transport path, are pierced with orifices, in particular by slits, capable of forming jets of air orientated in direction G towards the admission opening of the input face.

If we consider direction T as being the longitudinal direction of movement of the recipients through the transport enclosure, the air jets have directions G which are all globally opposite to direction T, but which can have differing angular orientations; each air jet does not, therefore, necessarily have a direction that is diametrically opposed to direction T. The number of air jets and the angular orientation of each of them is determined in such a way as to create the sought after frontal escape, over the entire cross-section of the admission opening of the input face of the device.

In a first alternative embodiment, the transport enclosure comprises an upper compartment and a lower compartment, both of them being separated by the transport channel in the shape of an inverted U, and by two lateral partitions; in this case, the supply chamber of the pneumatic means is formed in or by the upper compartment, and the pneumatic means include, over the length L of the enclosure, a plurality of orifices, in particular slits, provided in the transport channel and, as applicable, the lateral partitions, and capable of forming air jets orientated in direction G, opposite to T, and inclined obliquely by an angle $\alpha$ in relation to the vertical.

As the orifices or slits are formed in the upper part of the lower compartment, it is necessary, on one hand, for the air jets formed to be inclined obliquely and, on the other hand, for these orifices or slits to be formed over a distance sufficient for all of the air jets, cumulatively, to be able to generate the sought after frontal air escape.

Distance L1 is, of course, a function of the height H of the admission opening of the input face. Preferably, L1 is in the order of 1 to 2 H.

In one preferred exemplary embodiment, L1 is in the order of 500 to 600 mm, $\alpha$ is greater than 30°, preferably 45°, and the speed of the air jets is between 7 and 13 m/s.

In a second alternative embodiment, the supply chamber of the pneumatic means surrounds the recipient transport path, at least above and on either side of said transport path and, preferably also, below it.

In the first alternative embodiment, the direction of the air jets is necessarily obliquely downwards as they originate from the upper part of the lower compartment of the enclosure. In the second alternative embodiment, the orientations of the air jets can differ as they can originate from all points on the periphery of the transport path.

Advantageously, the orifices are formed in the inner side walls and, also, preferably, in the inner lower wall, of the supply chamber. This arrangement, with orifices that are more homogeneously distributed over the inner walls of the supply chamber, makes it possible to reduce the length L2 of the enclosure, by comparison with the distance L1 of the first alternative embodiment. In this case, L2 would be rather in the order of H, or even smaller.

In order to improve further the efficiency of the device, orifices can also be provided in the frontal wall of the supply chamber, a frontal wall that serves as the input face of the enclosure. This particular arrangement makes it possible to create an area upstream of the admission opening of the input face, which prolongs the effect of the frontal escape, an area which proves particularly appropriate if there are no recipients in front of the device.

When the supply chamber according to the second variant completely surrounds the recipient transport path, preferably, the orifices are orientated in such a way as to form air jets the direction of which is precisely opposite to direction T.

On the other hand, when the supply chamber surrounds the recipient transport path solely above and on either side of it, preferably, certain orifices are orientated in such a way as to form jets of air that are inclined obliquely downwards.

When the orifices take the form of several levels of longitudinal rows, advantageously, the angular orientation of the orifices increases in proportion as the levels approach the bottom of the chamber.

The anti-contamination device according to the invention is implemented in combination with an air conveyor, or any other equipment that has exactly the same equipment as said device as regards transport of the recipients: a guide rail and, preferably, a longitudinal transport channel. The device can be implemented as a modular anti-contamination unit, added onto the input face of said equipment, and thus structurally independent thereof. Advantageously, the device is integrated into said equipment, in the upstream area thereof, with the input face of the equipment forming the input face of the device. The device thus serves as an anti-contamination input air lock for the equipment in question. This arrangement is all the more advantageous in the case of a conveyor or of equipment provided with pneumatic means for transporting recipients in direction T; the air supply to the conveyor or the equipment can, in fact, be used to supply the pneumatic means of the device.

In particular, in an implementation integrated in a conveyor according to the first alternative form of embodiment, see above, the air conveyor has a known structure, except that there is an input area in which the transport channel is not provided with slots orientated to form air jets in direction T, that is to say slits permitting normal movement of the recipients in said direction T. In this area are provided orifices, preferably slits, possibly similar to the traditional slits, but which are orientated to form jets in the direction opposite to T.

The present invention will be more -readily understood from study of the description that will be given of several exemplary embodiments of a conveying line comprising an air conveyor equipped with an input air lock preventing the induction of polluted air via its input opening, illustrated by the annexed drawings, wherein.

Figure 1:
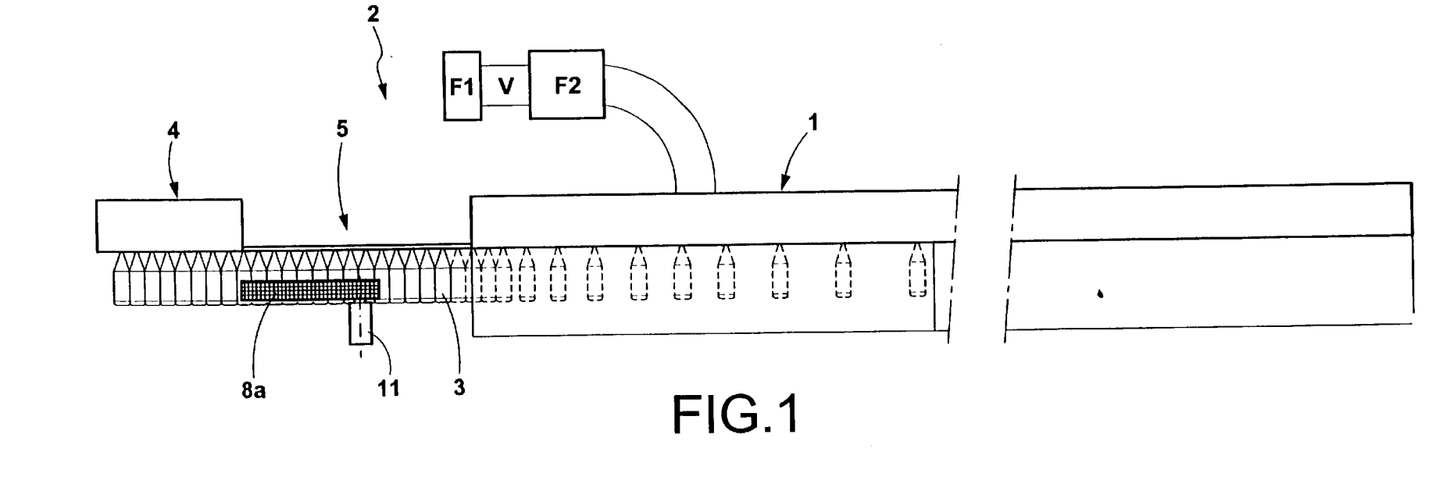
FIGS. 1 and 2 are schematic representations, side (FIG. 1) and top (FIG. 2) views, respectively, of a conveying line including the air conveyor equipped with an anti-contamination air lock according to the invention.
Figure 2:
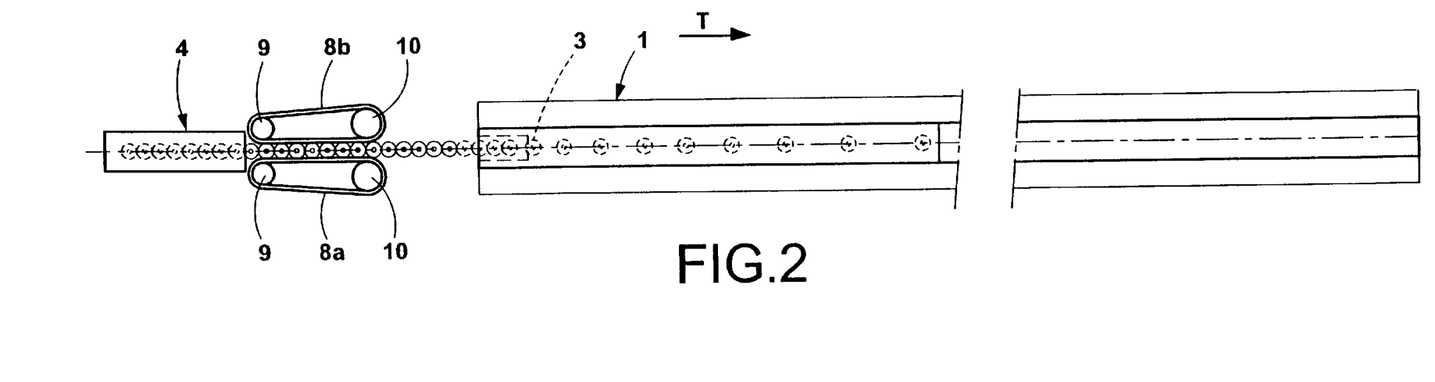

An air conveyor 1 generally forms part of a conveying line 2 permitting the distribution of recipients 3, such as empty plastic bottles, from one manufacturing station to another. In FIG. 1, conveying line 2 comprises in succession, in the direction T of movement of recipients 3, a work station 4, an accumulation and forced feed area 5 and an air conveyor 1.

Figure 3:
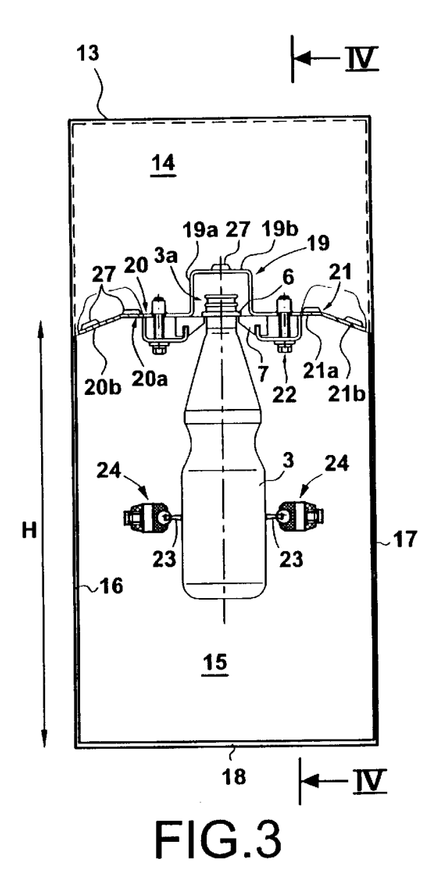
FIG. 3 is a schematic front view of a first example of a conveyor.

In accumulation and forced feed area 5, as elsewhere in conveyor 1, recipients 3 are suspended by a protuberance in the area of their necks, generally taking the form of a collar 6, by a guide rail 7 (FIG. 3). Forced feed in area 5 is obtained by means of two belts, 8a, 8b, disposed on either side of the aligned recipients 3, each belt being held taut between two cylinders 9, 10, one of which, 10, is driven in rotation by a motor 11. The two belts 8a, 8b, define between them a longitudinal space the width of which is adjusted to match the outside diameter of recipients 3. The two belts 8a, 8b thus come to press against the recipients and their respective movements causes that of recipients 10 in the direction of arrow T. A given recipient 3 is thus firstly driven by belts 8a, 8b, and then forced to move owing to the thrust of the recipients that follow it and which are in contact with said belts 8a, 8b. It is thus under these conditions that recipients 3 enter air conveyor 1.

Figure 4:
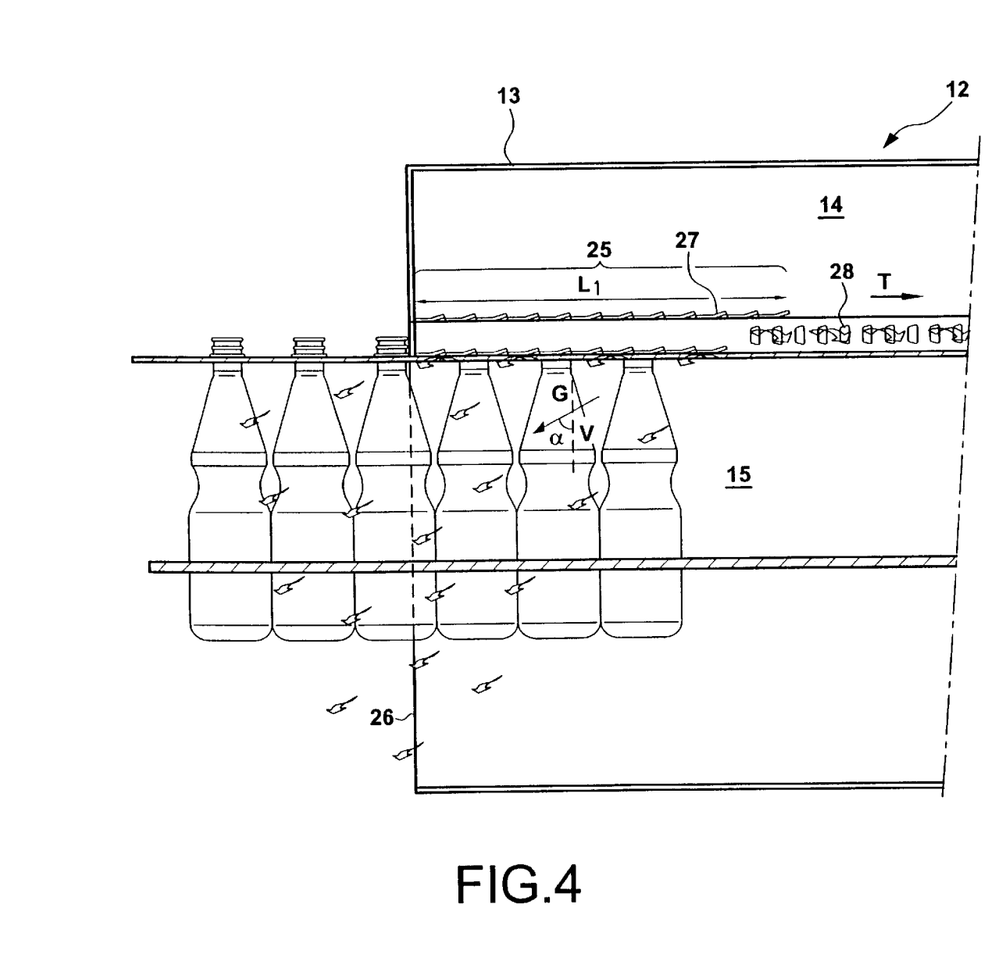
FIG. 4 is a schematic representation in longitudinal cross-section along line IV—IV of FIG. 3.

In the first exemplary embodiment, which is illustrated in FIGS. 3 and 4, air conveyor 12 is of a conventional structure in that it is chiefly constituted by a transport enclosure 13 comprising an upper compartment 14 and a lower compartment 15. Upper compartment 14 is supplied by a fan V (FIG. 1), a pre-filter F1 and a filter F2 being provided respectively at the input and the output of fan V. As the air introduced into the upper compartment is filtered, it is cleaner than the air surrounding the conveyor, upper compartment 14 thus constituting a chamber supplying "clean" air under pressure.

In the example illustrated, lower compartment 15 comprises two longitudinal walls 16, 17 and a lower wall 18, which completely closes said compartment 15, as taught in document WO 99/14143.

Recipients 3 are located in lower compartment 15, with collar 6 which bears on guide rail 7. Upper portion 3a of recipient 3 supported by guide rail 7 is surrounded by a transport channel 19, which is formed by an inverted U-shaped piece the side legs 19a of which overhang the two under-neck guides forming guide rail 7. The cross-section profile of this U channel is of no importance for the invention. It could be any channel having an open lower face, and surmounting guide rail 7, and, for example, a channel having a cross-section in the shape of an inverted V or equivalent. The upper, 14, and lower, 15, compartments are separated by transport channel 19 and by two side walls 20, 21 which extend on either side of transport channel 19 to longitudinal uprights 16, 17. The under-neck guides forming guide rail 7 are fixed to side walls 20, 21 by a fixing system 22 that permits their adjustment, particularly their respective spacing, as a function of the diameter of the collars 6.

There can also be provided lateral guides 23, borne by guide supports 24 and designed to hold the recipient laterally in a vertical position when it is supported by guide rail 7.

In a manner characteristic of the invention, in an upstream area 25 which extends over a length L1 from the input face 26 of transport enclosure 13, transport channel 19 and the two side walls 20, 21 are pierced by a plurality of slits 27 enabling the air under pressure contained in upper compartment 14 to be introduced into lower compartment 15 in the form of jets of air. Each slit 27 is orientated in such a way that the corresponding air jet has a general direction G that is globally opposite to the direction T of the recipients in conveyor 12. This general direction G is oblique, by an angle $\alpha$, in relation to the vertical V. The jets of air are orientated towards the admission opening of face 26 of enclosure 13. Each jet, originating from a slit 27, corresponds to a flow of air of a conical or similar shape. The pressure of the air in upper compartment 14 and the dimensions of slits 27 are determined in such a way that the speed of movement of the jets is between 7 and 13 m/s, an preferably in the order of 10 m/s.

In the example illustrated, over a distance L1 in the order of 500 to 600 mm there have been aligned, with a pitch in the order of 19 mm, slits 27, the substantially trapezoidal orifices of which have a width in the order of 9 mm and a thickness in the order of 1.5 mm. Exactly five rows of this type have been provided, the first in median leg 19b of transport channel 19, overhanging in relation to upper portion 3a of recipients 3, and two in each side wall 20, 21, one being in a horizontal portion 20a, 21a, close to transport channel 19, and the other in a downwards inclined portion 20b, 21b.

Beyond this upstream area 25, and even over a small distance including said area 25, transport channel 19 comprises conventional slits 28, which are formed in the two legs 19a of said channel 19. These slits 28 are orientated in such a way that the air under pressure contained in compartment 14 emerges in lower compartment 15 in the form of air jets having transport direction T. These air jets are sent over the upper portion 3a of recipient 3 and force it to move along guide rail 7. The situation is the same all along air conveyor 12, except for upstream area 25, which serves as an anticontamination input air lock.

In FIG. 3 is symbolically represented the stream of air formed by the set of air jets originating from all slits 27. This air stream, having a general direction G, represents the displacement of a considerable volume of air occupying the entire transverse cross-section of lower compartment 15 in the area of the admission opening of input face 26. It thus constitutes a frontal escape of air, from the internal volume of lower compartment 15 to the outside of conveyor 12 through said admission opening. This frontal escape of air opposes the penetration via this opening of the polluted air surrounding conveyor 12.

In this form of embodiment, length L1 is preferably in the order of one to two times the value of height H of lower compartment 15. This proportion is a function, in particular, of the angle of inclination $\alpha$ of the general direction G of the air jets. The smaller this angle $\alpha$, the greater the distance L1. This angle $\alpha$ should, however, be at least equal to 30°.

It will be appreciated that, in upstream area 25, the recipients can move, inside conveyor 12 only a result of the thrust due to the forced feed means. It is only once a recipient has passed upstream area 25 that it is subjected to the action of the air jets in direction T.

Figure 5:
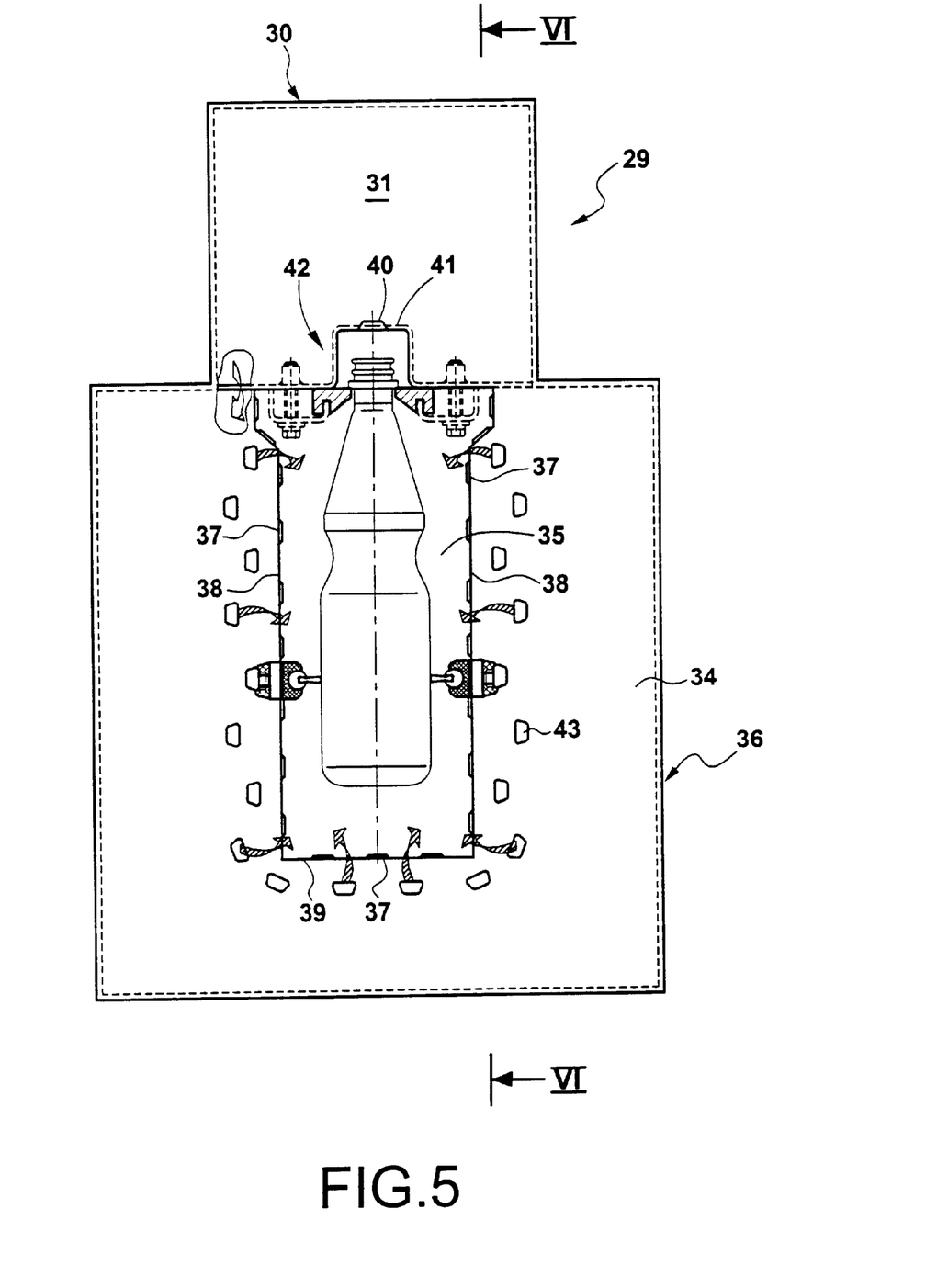
FIG. 5 is a schematic front view of a second exemplary embodiment of a conveyor.
Figure 6:
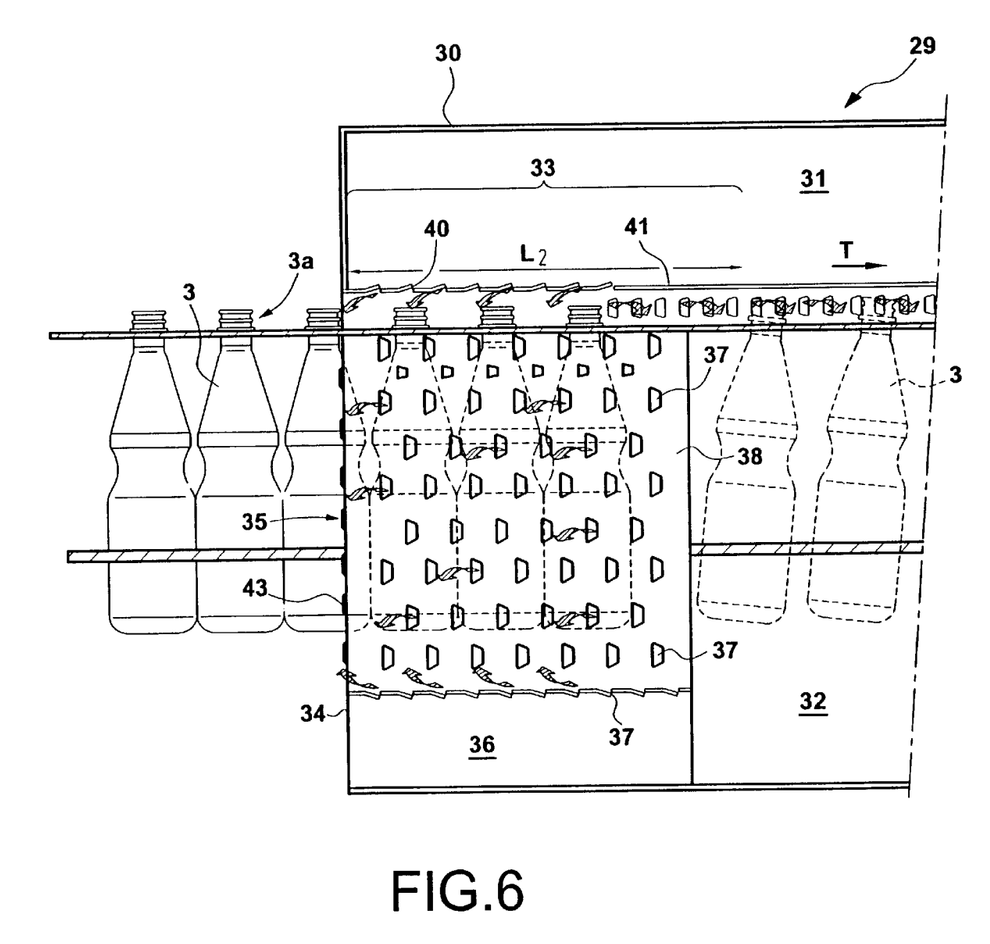
FIG. 6 is a schematic representation in longitudinal cross-section along line VI—VI of the conveyor of FIG. 5.

In the second exemplary embodiment that is illustrated in FIGS. 5 and 6, the structure of air conveyor 29 is the same as that of conveyor 12 that has just been described, in that transport enclosure 30 comprises an upper compartment 31 for supplying air under pressure and a lower compartment 32 the lower portion of which is completely closed. Specifically according to the invention, in an upstream area 33, over a distance L2 beyond input face 34 of enclosure 30, there is provided a secondary pressurised air supply chamber, which surrounds the recipient transport path from input face 34 over said distance L2 and which, preferably, is connected to upper compartment 31 which constitutes the primary pressurised air supply chamber. Thus, the pressurised air that is in upper chamber 31, originating from a fan, is distributed equally throughout the internal volume of secondary chamber 36.

First slits 37 are formed in the inner walls of secondary chamber 36, that is to say the walls that are turned towards recipients 3 when they move along inside enclosure 29.

In the example illustrated, these are slits disposed over several levels (nine in FIG. 6) in rows staggered at a pitch of approximately 38 mm over the two inner side walls 38 and over the inner lower wall 39 of secondary chamber 36. All these slits are formed in such a way that the corresponding air jets have a direction G opposite to direction T of movement of recipients 3 in conveyor 29.

It should be noted that, as is clearly apparent from a study of FIG. 5, the dimensions of the cross-section formed by the interior cavity of secondary chamber 36 and which constitutes the admission opening of recipients 3 are reduced as far as possible, being as close as possible to the configuration of the path of transport of the largest-sized recipients 3, that is to say the space occupied by said recipients when they are transported by conveyor 29.

Preferably, second slits 40 are formed, as in the first example, in median leg 41 of transport channel 42.

The combined action of all the air jets from slits 37, and also 40, makes it possible to displace a continuous stream of air, forming the frontal escape sought after to prevent any contamination from being introduced into lower compartment 32.

Preferably, third slits 43 are formed frontally on secondary chamber 36, that is to say on input face 34 of conveyor 29. These slits 43 are orientated towards admission opening 35 of said input face 34. The air jets originating from these third slits 43 contribute to optimising the anti-contaminant action of secondary chamber 36, in particular when there are no recipients in the area of input face 34.

Figure 7:
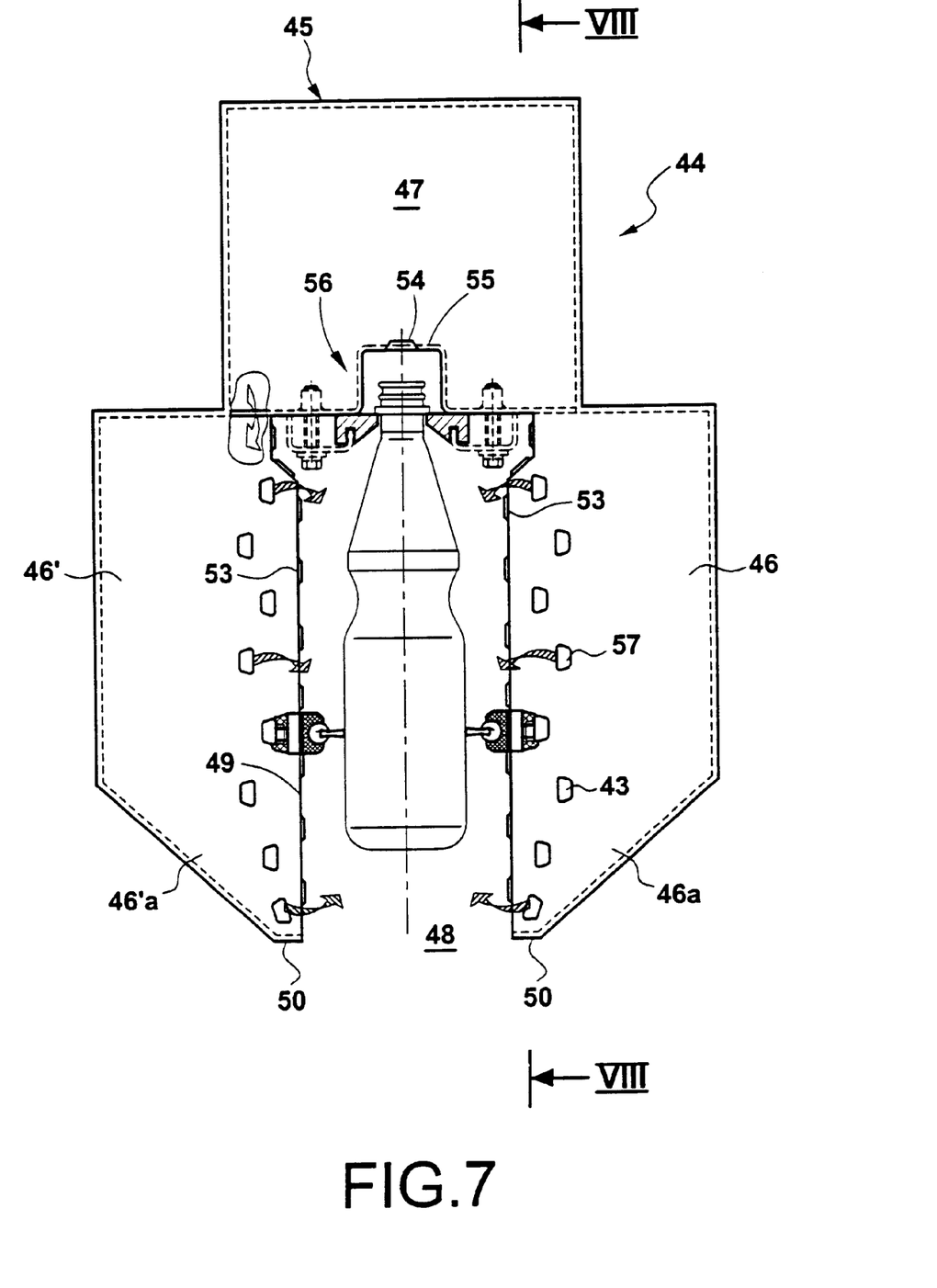
FIG. 7 is a schematic front view of a third exemplary embodiment of a conveyor.
Figure 8:
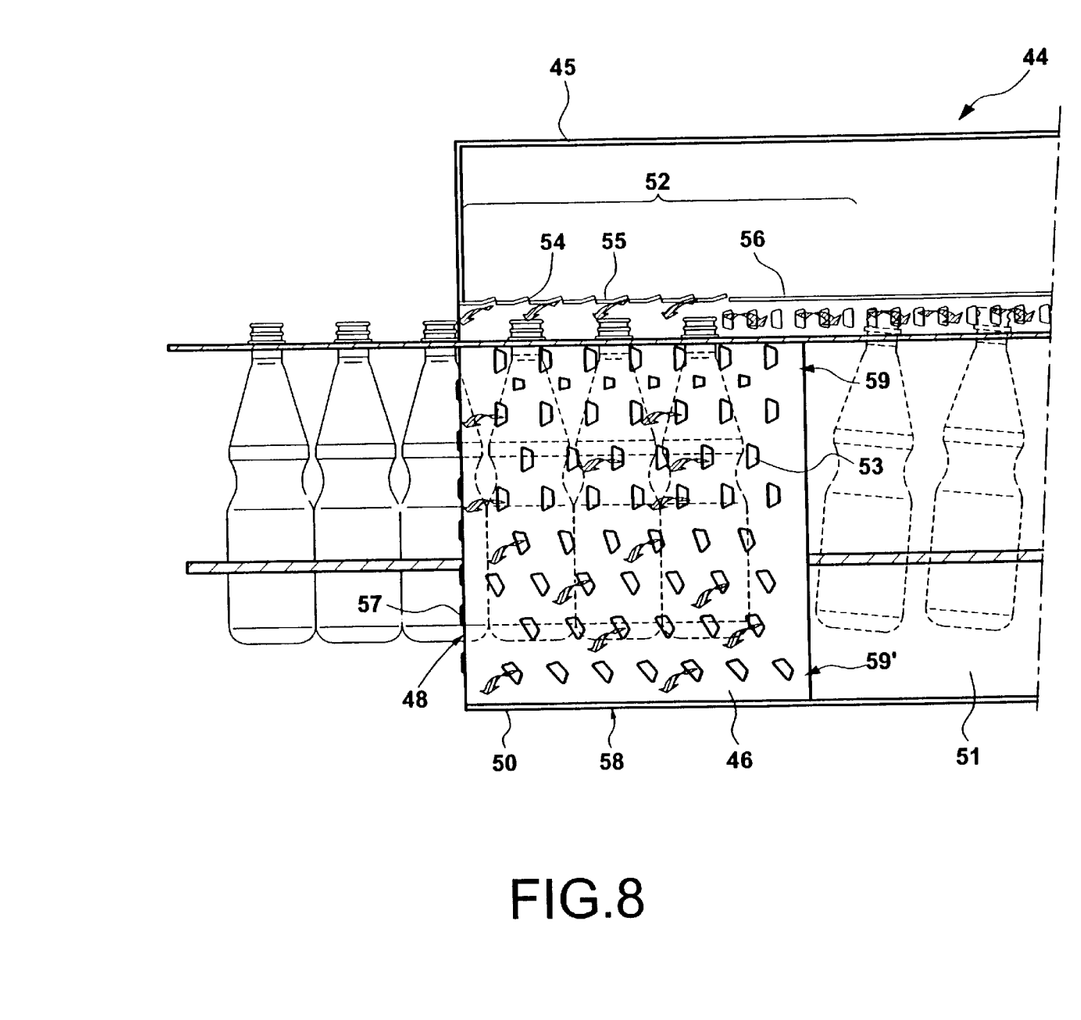
FIG. 8 is a schematic representation, in longitudinal cross-section along line VIII—VIII of FIG. 7.

In the third exemplary embodiment, which is illustrated in FIGS. 7 and 8, air conveyor 44 differs from conveyor 29 that has just been described in that the lower part of transport enclosure 45 is not closed. In this case, secondary pressurised air supply chamber 46, which is connected to upper compartment 47, does not completely surround admission opening 48 but only the two vertical, longitudinal walls 49 thereof. There are thus, in reality, two secondary chambers 46, 46', which are independent of one another and both connected to upper compartment 47. In lower part 46a, the interior cross-section of the two chambers, 46, 46', is reduced so as to converge towards lower end 50.

It should be noted that lower compartment 51 of the transport enclosure can have the same profile as the exterior walls of the two secondary chambers 46, 46', beyond upstream area 52 in which said secondary chambers 46, 46' are located.

First slits 53 are provided in the inner, vertical, walls 49 of secondary chambers 46, 46'. Second slots 54 can be provided in median leg 55 of transport channel 56. Third slots 57 can be provided in the frontal part of secondary chambers 46, 46', that is to say on input face 58 of transport enclosure 45. All these slits are equivalent to those described for the second exemplary embodiment, except for the inclination of certain of first slits 53 formed in inner walls 49 of secondary chambers 46, 46'.

As admission opening 48 is not, in fact, closed in its lower part, it is necessary for the air stream, formed by the accumulation of the air jets from all the slits 53, 54 to sweep the entire height of admission orifice 48, and also open lower part 58 of upstream area 52 in such a way as to create a barrier to prevent the introduction of polluted air not only in the frontal part of the admission opening but also in this open lower part 56. Preferably, slits 53 are formed in such a way that the air jets that they generate are increasingly inclined in proportion as the slits approach the lower part of secondary chambers 46, 46'. They are formed in longitudinal rows 59 of slits with the same angular orientation; the first levels of rows are orientated in direction G, diametrically opposed to T; the angular orientation of the following levels increases gradually in proportion as said levels 59' approach the bottom of chamber 46.

Figure 9:
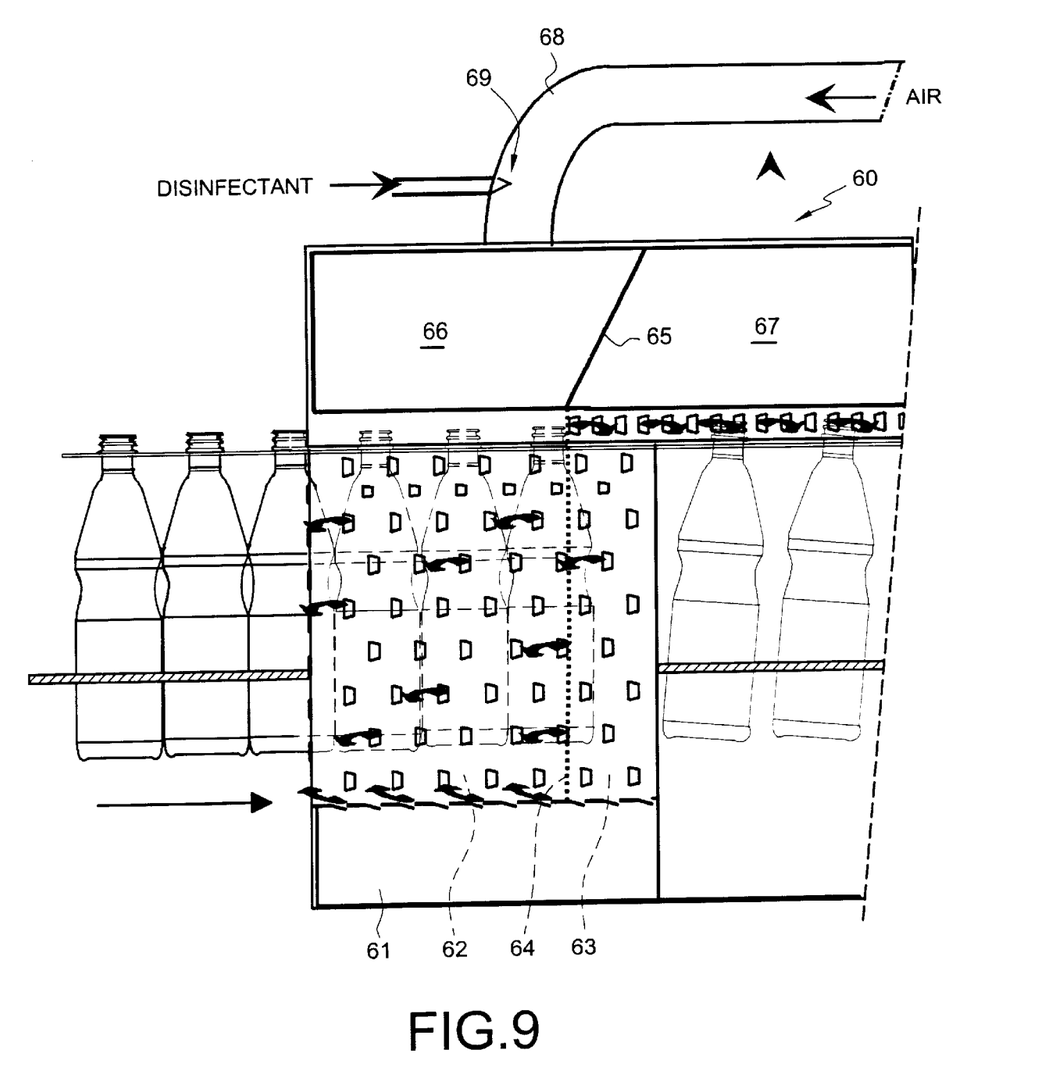
FIG. 9 is a schematic representation of an alternative embodiment.

In the fourth exemplary embodiment, of FIG. 9, air conveyor 60 differs from conveyor 29 of FIGS. 5 and 6 in that secondary pressurised air supply chamber 61 is divided into two secondary chambers, an upstream chamber 62 and a downstream chamber 63, by a sheet metal separator 64; in addition, a sheet metal separator 65 is provided in the upper air supply compartment, dividing this compartment into an upstream primary pressurised air supply chamber 66 and a downstream primary pressurised air supply chamber 67. Downstream primary chamber 67 communicates with downstream secondary chamber 63. Said downstream primary chamber 67 is supplied with pressurised air by a fan (not shown in FIG. 9) and thus permits the supply of pressurised air to downstream secondary chamber 63 also. Upstream primary chamber 66 is supplied with pressurised air either by a second fan, or by tapping from the output of the fan supplying downstream primary chamber 67. In FIG. 9, only air supply pipe 68 of upstream primary chamber 66 is shown. Upstream primary chamber 66 communicates with upstream secondary chamber 62, the supply of pressurised air from chamber 66 thus also permitting the supply of pressurised air to secondary chamber 62. In supply pipe 68 is mounted a spray nozzle 69, which is supplied with a disinfectant in liquid form, and which enables this disinfecting product to be sprayed into the supply air of upstream chamber 66. Upstream primary chamber 66 and upstream secondary chamber 62 are thus supplied with pressurised air mixed with a disinfecting product. As a result, the jets of air from the blowing slits of upstream secondary chamber 62 also perform a supplementary, decontaminating function. This can be decontamination of the recipients entering the conveyor, but these air jets can also be used to advantage in the absence of recipients, to disinfect in empty condition the entry to the conveyor forming an anti-contamination and decontamination air lock. It is, of course, important for the air introduced into upstream primary chamber 66 and upstream secondary chamber 62 not to be mixed with non disinfectant-containing air that is introduced into downstream primary chamber 67 and downstream secondary chamber 63. Sheet metal separators 65 and 64 will thus have to ensure adequate tightness between the upstream (66, 62) and downstream (67, 63) parts.

The present invention is not limited to the forms of embodiment that have just been described by way of non-exhaustive examples. In particular, the slits that are contemplated for forming air jets the direction of which is globally opposite to transport direction T can be produced by punching and have the same dimensions as those formed in the side legs of the transport channel for positively moving the recipients. These slits can, however, have different configurations to obtain the sought after frontal escape effect. For instance, in the case of the inner walls of the secondary chamber or chambers, these can be slits of greater length, possibly covering the entire height of said inner walls, forming, as it were, air layers.

In addition, the three exemplary embodiments that have been described relate to the integration of the device according to the invention as an input air lock of an air conveyor. This not, of course, a limiting feature of the invention. The device could be constructed in the form of an independent modular unit, and mounted, for example, at the front of an existing air conveyor or any other equipment in which the recipients are transported. In particular, such a modular unit, the structure of which preferably conforms to the third alternative embodiment, could be implemented as an anti-contamination air lock for transporting the recipients between two rooms, in particular when the level of contamination in the room located downstream has to be well below that of the upstream room. The modular unit of the invention is mounted through the separating wall between the two rooms and allows the recipients to pass from the upstream to the downstream room while preserving the low level of contamination of the downstream room.

What is claimed is:

1. Anti-contamination device, in which recipients comprising a protuberance in a neck area are moved in a direction T along a transport path, said device including a transport enclosure which has an input face having an opening to admit the recipients and which contains:

a guide rail capable of supporting the recipients by their protuberances;

a longitudinal transport channel surmounting the guide rail, characterised in that it comprises pneumatic means for blowing air in a direction G globally opposite to direction T, said means being capable of forming a frontal escape of air, from the inside towards the outside of the enclosure, via the admission opening of the input face.

2. Device according to claim 1, characterised in that the pneumatic means for blowing air comprise a chamber for supplying pressurised air, the wall or walls of which, turned towards the recipient transport path, is or are pierced with orifices, in particular by slits, capable of forming jets of air orientated in a direction globally opposite to direction T towards the admission opening of the input face.

3. Device according to claim 2, characterised in that the transport enclosure comprises an upper compartment and a lower compartment, both of them being separated by the transport channel and by two lateral partitions, in that the supply chamber of the pneumatic means is formed in the upper compartment, and in that the pneumatic means include a plurality of orifices, in particular slits, provided in the transport channel and, as applicable, the lateral partitions capable of forming air jets orientated in direction G, opposite to T, and inclined obliquely by an angle α in relation to the vertical.

4. Device according to claim 3, characterised in that the length of the enclosure L is in the order of 1 to 2 times the height H of the admission opening of the input face.

5. Device according to claim 3, characterised in that length L is in the order of 500 to 600 mm, $\alpha$ is greater than 30°, preferably 45°, and the speed of the air jets is between 7 and 13 m/s.

6. Device according to claim 2, characterised in that the supply chamber of the pneumatic means surrounds the recipient transport path, at least above and on either side of said transport path and, preferably also, below it.

7. Device according to claim 6, characterised in that the orifices are formed in the inner side walls and, preferably also, in the inner lower wall, of the supply chamber.

8. Device according to claim 6, characterised in that orifices are formed in the frontal wall of the supply chamber.

9. Device according to claim 6, in which the supply chamber surrounds the transport path solely above and on either side of it, characterised in that the orifices in the inner walls take the form of several levels of longitudinal rows, the angular orientation ($\alpha$) of the orifices progressing in proportion as the levels approach the bottom of the chamber.

10. Device according to claim 9, characterised in that it is mounted through a separating wall between two rooms, in particular between an upstream room and a downstream room, the degree of contamination in the downstream room being lower than that in the upstream room.

11. Device according to claim 1, characterised in that the pneumatic air blowing means comprise means permitting the introduction of a disinfecting product into the air that is blown, in such a way that the device performs a supplementary decontamination function.

12. Air conveyor characterised in that it is equipped with the device according to claim 1 as an anti-contamination air lock.

13. Air conveyor according to claim 12, in which the air contamination device is integrated in the upstream area of said conveyor, the input face of the conveyor and the input face of the device being one and the same and the pneumatic means of the conveyor and of the device having a common pressurised air supply chamber.

14. Air conveyor for recipients, comprising a protuberance in the area of their necks, characterised in that it is equipped with the device according to claim 11 as an anti-contamination and decontamination air lock.

15. Device according to claim 4, characterised in that length L is in the order of 500 to 600 mm, $\alpha$ is greater than 30°, preferably 45°, and the speed of the air jets is between 7 and 13 m/s.

16. Device according to claim 7, characterised in that orifices are formed in the frontal wall of the supply chamber.

17. Device according to claim 10, characterised in that the pneumatic air blowing means comprise means permitting the introduction of a disinfecting product into the air that is blown, in such a way that the device performs a supplementary decontamination function.

18. Air conveyor characterised in that it is equipped with the device according to claim 9 as an anti-contamination air lock.

19. Air conveyor according to claim 18, in which the air contamination device is integrated in the upstream area of said conveyor, the input face of the conveyor and the input face of the device being one and the same and the pneumatic means of the conveyor and of the device having a common pressurised air supply chamber.

* * * * *